United States Patent
Konokawa et al.

(10) Patent No.: US 8,795,843 B2
(45) Date of Patent: *Aug. 5, 2014

(54) ACRYLIC FILM FOR PUNCHING, SURFACE LIGHT-SOURCE DEVICE AND PROCESS FOR MANUFACTURING OPTICAL MEMBER

(75) Inventors: Yuuhei Konokawa, Hiroshima (JP); Yoshiaki Satou, Hiroshima (JP); Kousuke Fujiyama, Hiroshima (JP); Yasuhiko Nabeshima, Hiroshima (JP); Tomoyoshi Yamashita, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 13/384,048

(22) PCT Filed: Jul. 9, 2010

(86) PCT No.: PCT/JP2010/061659
§ 371 (c)(1),
(2), (4) Date: Jan. 13, 2012

(87) PCT Pub. No.: WO2011/007720
PCT Pub. Date: Jan. 20, 2011

(65) Prior Publication Data
US 2012/0127757 A1    May 24, 2012

(30) Foreign Application Priority Data

Jul. 14, 2009 (JP) .................... 2009-166045
Jan. 6, 2010 (JP) .................... 2010-001189

(51) Int. Cl.
B32B 27/32 (2006.01)
B32B 27/00 (2006.01)
B29D 11/00 (2006.01)
C08F 2/46 (2006.01)

(52) U.S. Cl.
USPC ......... 428/500; 428/220; 428/332; 520/1; 522/1; 522/178; 522/182; 522/183

(58) Field of Classification Search
None
See application file for complete search history.

(56) References Cited

U.S. PATENT DOCUMENTS

| 5,247,038 A | 9/1993 | Fukushima et al. |
| 2002/0163726 A1 | 11/2002 | Masaki et al. |
| 2005/0196624 A1 | 9/2005 | Kawamura et al. |
| 2005/0271863 A1 | 12/2005 | Masuda |
| 2009/0269008 A1 | 10/2009 | Fukuda et al. |

FOREIGN PATENT DOCUMENTS

| JP | 4 36306 | 2/1992 |
| JP | 11 61081 | 3/1999 |
| JP | 2002 236203 | 8/2002 |
| JP | 2005 239805 | 9/2005 |
| JP | 2005 319702 | 11/2005 |
| JP | 2007 029679 | 3/2007 |
| JP | 2008 62571 | 3/2008 |
| JP | 2006 210140 | 8/2008 |
| JP | 2008 218207 | 9/2008 |
| JP | 2010 18792 | 1/2010 |

OTHER PUBLICATIONS

U.S. Appl. No. 13/820,394, filed Apr. 23, 2013, Nabeshima, et al.
U.S. Appl. No. 13/496,211, filed May 25, 2012, Konokawa, et al.
International Search Report Issued Aug. 31, 2010 in PCT/JP10/61659 Filed Jul. 9, 2010.

*Primary Examiner* — Sheeba Ahmed
(74) *Attorney, Agent, or Firm* — Oblon, Spivak, McClelland, Maier & Neustadt, L.L.P.

(57) ABSTRACT

Provided is an acrylic film for punching excellent in transparency and free from breakage or whitening even if it is punched. The present invention is an acrylic film for punching containing a polymer (C) containing a di(meth)acrylate (A) unit represented by general formula (1) below and a mono (meth)acrylate (B) unit:

$$-CH_2-CR^1-COO-(X)_n-COCR^1-CH_2- \quad (1)$$

wherein (X) represents at least one repeat unit selected from $C_2H_4O$, $C_3H_6O$ and $C_4H_8O$; the molecular weight of $(X)_n$ is 500 or more; and $R^1$ represents H or $CH_3$.

20 Claims, 5 Drawing Sheets

US 8,795,843 B2

ACRYLIC FILM FOR PUNCHING, SURFACE LIGHT-SOURCE DEVICE AND PROCESS FOR MANUFACTURING OPTICAL MEMBER

FIELD OF THE INVENTION

The present invention relates to an acrylic film for punching, a surface light-source device and a process for manufacturing an optical member.

DESCRIPTION OF THE RELATED ART

A liquid-crystal display device, because of a thin, light and power-saving device, has been often used in displays of portable equipment. Since the liquid-crystal display device does not emit light by itself, it requires an illuminating means. As an illuminating device used in a general liquid-crystal display device, a surface light-source device called a backlight is used.

Conventionally, a cold cathode discharge tube has been used as a light-emitting device (light-source) of a backlight. Recently, a light-emitting diode (LED) has been used also as a light-emitting device.

As a thin backlight, a sidelight-type backlight having a light-emitting device at a side surface is known. The sidelight-type backlight has a plate-form light guide plate. The light guide plate is formed of a highly transparent resin and light incident upon the light guide plate from the light-emitting device propagates through the light guide plate. Furthermore, the light guide plate is provided with a reflection/scattering member such as a groove, a projection or a print piece. Owing to the presence of the reflection/scattering member, light propagating through the light guide plate is emitted towards a liquid-crystal display device.

It is easy to reduce the thickness of an LED compared to a cold cathode discharge tube. Recently, an LED having a thickness of 500 µm or less has also come to be available. In accordance with this, the thickness of the light guide plate has been reduced to coincide with thickness of an LED.

When an LED is used as a light-emitting device, since the LED is a point light-source, it is difficult to apply light uniformly to a planar side surface, unlike a conventional cold cathode tube.

Then, for example, Patent Literature 1 proposes a light guide plate in which light is applied to a side surface of a light guide plate having a micro convexoconcave configuration such as a prism configuration, e.g., a V-shaped or triangular configuration continuously formed at regular pitches, or a circular arc or wave-form configuration continuously formed, and spread by each of these micro convexoconcave configurations to obtain uniform luminance of light emitted from a light emitting surface of the light guide plate.

As a process for forming a micro convexoconcave configuration, a process in which a resin is molded into a film or sheet and subjected to cutting work or punching; and an injection molding process in which molten resin is poured in a mold are known. However, in the injection molding process, it is difficult to pour a resin uniformly into a mold to form a thin film and the cutting-work process is not suitable for a large-scale production. In the circumstances, a need for forming a configuration by punching process, which is capable of forming a micro convexoconcave configuration simply and inexpensively, has been increased.

Furthermore, other than a purpose for forming a micro convexoconcave configuration, punching has been frequently used for continuously or simultaneously forming a plurality of film pieces having a predetermined size.

Furthermore, as a film serving as an optical film, a transparent polycarbonate film and an acrylic film are known. Of these films, the acrylic film is particularly excellent in view of characteristics on transparency such as total light transmissivity, haze and yellow chromaticity. Because of this, a demand for an acrylic film which is punched and used as optical films has been increased.

However, conventional acrylic films are fragile. Thus, acrylic films are not suitable to be subjected to a manufacturing process for continuously or simultaneously forming a plurality of film pieces having a predetermined size or a manufacturing process for forming a micro convexoconcave configuration by punching. Improvement of the acrylic films has been desired.

As a process for improving the strength of an acrylic film, for example, Patent Literature 2 proposes a light guide plate for a surface light-source device formed by using a film of a predetermined thickness having rubber particles dispersed in a methacrylic resin.

However, if the film obtained in Patent Literature 2 is punched, whitening may occur at an edge surface of the punched film. Thus, improvement has been desired.

CITATION LIST

Patent Literature

Patent Literature 1: JP2006-210140A
Patent Literature 2: JP2008-218207A

SUMMARY OF THE INVENTION

Problems to be Solved by the Invention

An object of the present invention is to provide an acrylic film for punching capable of providing an acrylic film excellent in transparency and free from breakage or whitening even if it is punched. Another object of the present invention is to provide a process for manufacturing an optical member using the film and a surface light-source device.

Means for Solving the Problems

The present invention is an acrylic film for punching containing a polymer (C) containing a di(meth)acrylate (A) unit represented by the general formula (1) below and a mono (meth)acrylate (B) unit:

$$-CH_2-CR^1-COO-(X)_n-COCR^1-CH_2- \quad (1)$$

wherein (X) represents at least one repeat unit selected from $C_2H_4O$, $C_3H_6O$ and $C_4H_8O$; the molecular weight of $(X)_n$ is 500 or more; and $R^1$ represents H or $CH_3$.

Furthermore, the present invention is a process for manufacturing an optical member including forming a fine convexoconcave configuration on one or both of the surfaces of the acrylic film for punching and punching the acrylic film to prepare the optical member.

Furthermore, the present invention is a surface light-source device emitting planar light by converting light from a single or a plurality of light-sources into planar light, which includes a light guide body; at least one light-source arranged in adjacent to an edge surface of the light guide body; a light deflection device arranged in contact with a surface of the light guide body; and a reflector arranged in contact with the rear surface of the light guide body, in which the light guide body is formed of the acrylic film for punching.

Furthermore, the present invention is a surface light-source device emitting planar light by converting light from a single or a plurality of light-sources into planar light, which includes a light guide body; at least one light-source arranged in adjacent to an edge surface of the light guide body; a light deflection device arranged in contact with a surface of the light guide body; and a reflector arranged in contact with the rear surface of the light guide body, in which the light guide body is constituted of a polymer (C) containing a di(meth)acrylate (A) unit represented by the general formula (1) above and a mono(meth)acrylate (B) unit.

Furthermore, the present invention is a light guide body for a surface light-source device constituted of a polymer (C) containing a di(meth)acrylate (A) unit represented by the general formula (1) above and a mono(meth)acrylate (B) unit.

Effect of the Invention

The acrylic film obtained by the present invention is excellent in transparency and free from breakage or whitening even if it is punched. Accordingly, the acrylic film is suitable for use in, for example, general members such as electric and electronic parts, optical filters, automobile parts, mechanical mechanism parts, housing of and parts of office automation equipment/household electrical, and parts of general merchandises; optical members such as Fresnel lens, a polarizing film, a polarizer protecting film, a phase difference film, a light diffusion film, a viewing-angle enlarging film, a reflection film, a antireflection film, a glare-proof film, a luminance improving film, a prism sheet, a micro-lens array, a conductive film for a touch panel and a reflection material for a road traffic sign; and light guide plates such as a thin liquid crystal display, a flat panel display, a plasma display, a cell phone display, a cell phone key-pad illumination, personal computer keyboard illumination and other advertising displays.

DESCRIPTION OF EMBODIMENTS

<Di(meth)acrylate (A) Unit>

Figure 1:
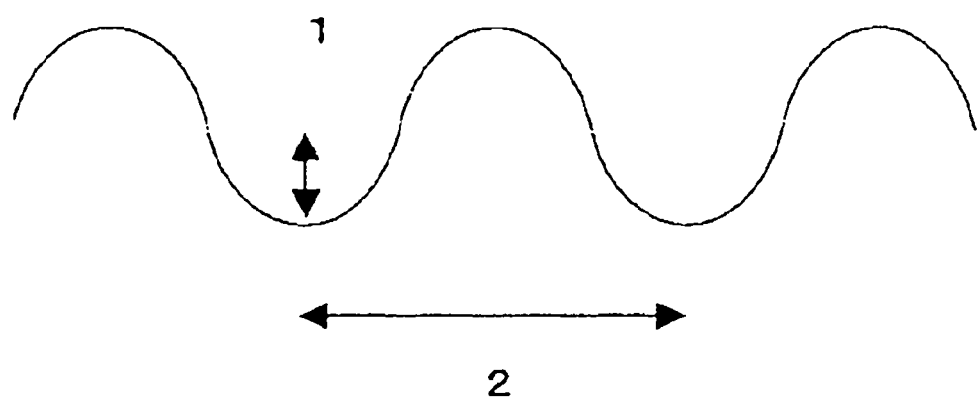
FIG. 1 is a schematic view showing a configuration of a punching die.

In the present invention, di(meth)acrylate (A) unit is a monomer unit represented by the general formula (1) and one of the structural units of a polymer (C).

The di(meth)acrylate (A) unit has a highly flexible long-chain molecular structure containing a crosslinked structure. Owing to the structure, the di(meth)acrylate (A) unit is introduced in a polymer (C) in order to improve punching processability of the acrylic film for punching of the present invention.

In the present invention, (X) of the general formula (1) represents at least one repeat unit selected from $C_2H_4O$, $C_3H_6O$ and $C_4H_8O$. If the above repeat unit is employed as (X), transparency and flexibility can be imparted to the acrylic film for punching of the present invention.

In the present invention, when the acrylic film for punching of the present invention is used as an optical member, $C_4H_8O$, which has the highest hydrophobicity, is preferably used as the repeat unit (X).

The molecular weight of $(X)_n$ is 500 or more, preferably 500 to 10,000 and more preferably 600 to 2,000. If the molecular weight of $(X)_n$ is 500 or more, the punching processability of the acrylic film for punching of the present invention can be improved. Furthermore, in view of the transparency of the acrylic film for punching of the present invention, the molecular weight of $(X)_n$ is preferably 10,000 or less. If the molecular weight of $(X)_n$ is 10,000 or less, it is likely to suppress development of a phase-separation structure during a polymerization process for obtaining a polymer constituting the acrylic film for punching of the present invention.

Symbol n of $(X)_n$ is a natural number. For example, when (X) is a repeat unit of $C_4H_8O$ having a molecular weight of 72 and n is 9, the molecular weight of $(X)_n$ is calculated to be 642. Note that, di(meth)acrylate (A) is a mixture of polymers different in degree of polymerization and has a normal distribution. Therefore, the number of repeat units, n, is a median value.

$(X)_n$ may have either a single polymer form or a copolymer form. Alternatively, $(X)_n$ may be a random polymer, a block polymer or an alternating copolymer.

Examples of the di(meth)acrylate (A), which is a raw material for constituting a di(meth)acrylate (A) unit, include a polyethylene glycol di(meth)acrylate having 12 or more repeat units (n), such as dodecaethylene glycol di(meth)acrylate, tridecaethylene glycol di(meth)acrylate, tetradecaethylene glycol di(meth)acrylate, pentadecaethylene glycol di(meth)acrylate, hexadecaethylene glycol di(meth)acrylate; a polypropylene glycol di(meth)acrylate having 9 or more repeat units (n), such as nonapropylene glycol di(meth)acrylate, decapropylene glycol di(meth)acrylate, undecapropylene glycol di(meth)acrylate, dodecapropylene glycol di(meth)acrylate and tridecapropylene glycol di(meth)acrylate; and a polybutylene glycol dimethacrylate having 7 or more repeat units (n), such as heptabutylene glycol di(meth)acrylate, octabutylene glycol di(meth)acrylate, nonabutylene glycol di(meth)acrylate, decabutylene glycol di(meth)acrylate and undecabutylene glycol di(meth)acrylate. These can be used alone or in combination of two or more types.

Specific examples of the di(meth)acrylate (A) include ACRYESTER PBOM manufactured by Mitsubishi Rayon Co., Ltd., BLEMMER PDE-600, BLEMMER PDP-700, BLEMMER PDT-650, BLEMMER 40PDC1700B and BLEMMER ADE-600 manufactured by NOF Corporation, and NK Ester A-600, NK Ester A-1000, NK Ester APG-700, NK Ester 14G and NK Ester 23G manufactured by Shin-Nakamura Chemical Co., Ltd (all are trade names). They are industrially available and can be suitably used.

Note that, in the present invention, "(meth)acrylate" refers to at least one selected from "acrylate" and "methacrylate".

<Mono(meth)acrylate (B) Unit>

Mono(meth)acrylate (B) unit used in the present invention is one of the structural units of the polymer (C).

The mono(meth)acrylate (B) unit is introduced in a polymer (C) in order to enhance elastic modulus of the acrylic film for punching of the present invention.

Examples of the mono(meth)acrylate (B), which is a raw material for constituting the mono(meth)acrylate (B) unit, include an alkyl(meth)acrylate, such as methyl(meth)acrylate, ethyl(meth)acrylate, n-butyl(meth)acrylate, isobutyl (meth)acrylate, t-butyl(meth)acrylate, n-propyl(meth)acrylate, isopropyl(meth)acrylate, 2-ethylhexyl(meth)acrylate and lauryl(meth)acrylate; an aromatic methacrylate such as phenyl(meth)acrylate and benzyl(meth)acrylate; and an alicyclic methacrylate such as isobornyl(meth)acrylate, methylcyclohexyl(meth)acrylate, t-butylcyclohexyl(meth)acrylate, 1-adamantyl(meth)acrylate, 2-methyl-2-adamantyl (meth)acrylate and 2-ethyl-2-adamantyl(meth)acrylate. These can be used alone or in combination of two or more types. Of them, methyl methacrylate is preferable in view of transparency.

<Polymer (C)>

In the present invention, a polymer (C) is a polymer containing a di(meth)acrylate (A) unit and a mono(meth)acrylate (B) unit and can impart punching processability to the acrylic film for punching of the present invention.

The composition ratio of di(meth)acrylate (A) unit in a polymer (C) is preferably 10 to 90 mass %, more preferably 30 to 70 mass % and particularly preferably 35 to 65 mass %, in view of the punching processability of the acrylic film for punching of the present invention.

In the present invention, a polymer (C) may contain, if necessary, another monomer unit other than a di(meth)acrylate (A) unit and a mono(meth)acrylate (B) unit.

Examples of a monomer, which is a raw material for constituting another monomer unit, include an aromatic vinyl monomer such as styrene and α-methylstyrene; a monovinyl monomer such as a nitrile group-containing vinyl monomer, e.g., acrylonitrile and methacrylonitrile; and a polyvinyl monomer such as ethylene glycol di(meth)acrylate other than di(meth)acrylate (A). These can be used alone or in combination of two or more types.

In the present invention, if necessary, a mold-releasing agent can be added to a polymer (C).

The content of a mold-releasing agent is preferably 0.005 to 0.5 parts by mass relative to 100 parts by mass of a polymer (C). If the content of a mold-releasing agent is 0.005 parts by mass or more, the resultant acrylic film for punching of the present invention is likely to have a satisfactory mold-releasing property when it is removed from a mold formed of polyethylene terephthalate (PET) film, stainless steel or the like. Furthermore, if the content of a mold-releasing agent is 0.5 parts by mass or less, the water absorptivity and surface state of the acrylic film for punching of the present invention are likely to improve.

Examples of the mold-releasing agent include sodium dioctylsulfosuccinate (trade name: AEROSOL OT-100) manufactured by Mitsui Cytec Ltd. and a mixture containing a diethyl ester of phosphoric acid and a mono ethyl ester of phosphoric acid in a ratio of 55:45 (trade name: JP-502) manufactured by Johoku Chemical Co., Ltd.

In the present invention, additives such as a lubricant, a plasticizer, an antimicrobial agent, a mildew-proofing agent, an optical stabilizer, a UV absorber, a bluing agent, a dye, an antistatic agent and a thermo-stabilizer can be added depending upon the purpose.

Examples of a process for obtaining a polymer (C) include, a mass polymerization process, a solution polymerization process, an emulsification polymerization process and suspension polymerization process.

As a polymerization means for a polymer (C), any one of the means such as a thermal polymerization method, active energy ray polymerization method and a combination thereof may be employed.

A polymerization initiator for use in polymerization of a monomer material (hereinafter referred to as "monomer material (c)") for obtaining a polymer (C) is not particularly limited as long as it is a thermal polymerization initiator or an photopolymerization initiator used in a thermal polymerization or active energy ray polymerization.

Examples of the thermal polymerization initiator include an organic peroxide-based polymerization initiator, such as benzoyl peroxide, lauroyl peroxide, t-butylperoxy isobutyrate, t-butylperoxy-2-ethylhexanoate, t-butylperoxy neodecanoate, t-hexylperoxy pivalate, diisopropylperoxy dicarbonate and bis(4-t-butylcyclohexyl)peroxy dicarbonate; and an azo-based polymerization initiator, such as 2,2'-azobisisobutyronitrile and 2,2'-azobis(2,4-dimethylvaleronitrile) 2,2'-azobis(4-methoxy-2,4-dimethylvaleronitrile). These can be used alone or in combination with two or more types.

Examples of the photopolymerization initiator include 1-hydroxy-cyclohexyl-phenyl-ketone, 2-hydroxy-2-methyl-1-phenylpropan-1-one, hydroxycyclohexyl phenyl ketone, methyl phenyl glyoxylate, acetophenone, benzophenone, diethoxyacetophenone, 2,2-dimethoxy-2-phenyl acetophenone, 1-phenyl-1,2-propane-dione-2-(o-ethoxycarbonyl) oxime, 2-methyl[4-(methylthio)phenyl]-2-morpholino-1-propanone, benzyl, benzoin methyl ether, benzoin ethyl ether, benzoin isopropyl ether, benzoin isobutyl ether, 2-chlorothioxanthone, isopropylthioxanthone, 2,4,6-trimethylbenzoyl diphenyl phosphine oxide, benzoyl diphenyl phosphine oxide, 2-methylbenzoyl diphenyl phosphine oxide and benzoyl dimethoxy phosphine oxide. These can be used alone or in combination with two or more types.

The addition amount of thermal polymerization initiator or photopolymerization initiator in the monomer material (c) is preferably 0.005 to 5 parts by mass relative to 100 parts by mass of the monomer material (c), more preferably 0.01 to 1 part by mass, and particularly preferably 0.05 to 0.5 parts by mass. If the content of the thermal polymerization initiator or the photopolymerization initiator is 5 parts by mass or less, it is likely to suppress the coloration of a polymer (C). Furthermore, if the content of the thermal polymerization initiator or the photopolymerization initiator is 0.005 parts by mass or more, it is likely to perform the polymerization not for excessively long time but for the proper amount of time.

In the present invention, as a monomer material (c), a syrup like substance (c'), in which a mixture of a di(meth)acrylate (A) and a mono(meth)acrylate (B) is partly polymerized, i.e., a copolymer of a di(meth)acrylate (A) and a mono(meth) acrylate (B) is dissolved in a mixture of a di(meth)acrylate (A) and a mono(meth)acrylate (B), can be used.

<Acrylic Film for Punching>

The acrylic film for punching of the present invention contains a polymer (C) and is excellent in punching processability and transparency.

The acrylic film for punching of the present invention, in view of punching processability, preferably has a stretch rate of 30% or more at the time of film cutting in a tensile test performed in accordance with JIS K6251 using a test piece of Dumbbell-form No. 1 at 23° C. and 500 mm/minute. Furthermore, the acrylic film for punching of the present invention more preferably has a stretch rate of 40% or more and particularly preferably 50% or more at the time of film cutting, in view of processability at a high-speed punching process.

Since the acrylic film for punching of the present invention is excellent in the aforementioned characteristics, a molded product obtained by punching can be suitably used as an optical member.

Examples of the optical member include reflection materials for use in Fresnel lens, a polarizing film, a polarizer protecting film, a phase difference film, a light diffusion film, a viewing-angle enlarging film, a reflection film, an antireflection film, a glare-proof film, a luminance improving film, a prism sheet, a micro-lens array, a conductive film for a touch panel and a road traffic sign, etc.; and sidelight-type light guide plates for use in a solar battery film, a cell phone front surface protecting film, a cell phone contrast improving film, a thin liquid crystal display, a flat panel display, a plasma display, a cell phone display, a cell phone key pad illumination, personal computer keyboard illumination and other advertising displays, etc.

Furthermore, since the acrylic film for punching of the present invention is excellent in the above characteristics, a molded product obtained by punching and having a micro convexoconcave configuration formed on a film side surface (edge surface) can be suitably used as a light guide plate.

When the acrylic film for punching of the present invention is used as a light guide plate, for example, a micro convexoconcave configuration such as a mat structure, a dot configuration or a prism array structure can be formed on both or one of the surfaces. The micro convexoconcave configurations may be used singly or in combination with two or more types.

The transparency of the acrylic film for punching of the present invention can be evaluated by applying light from an edge surface (a) of the acrylic film and measuring the edge-surface luminance of the light emitted from an edge surface (b) opposite to the edge surface (a).

Figure 2:
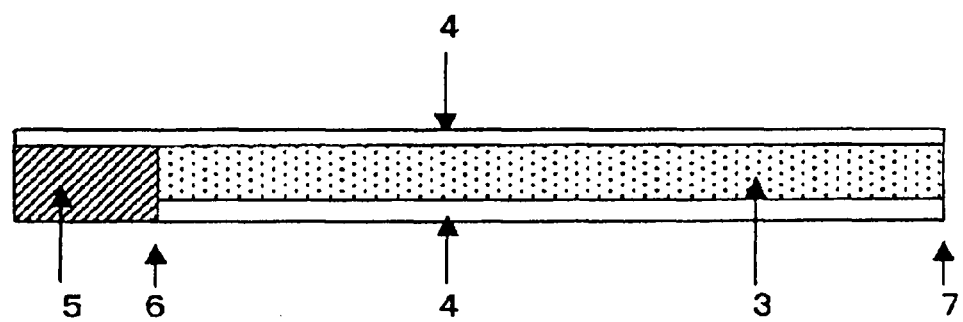
FIG. 2 is a schematic view showing a structure of an apparatus for measuring luminance at an edge surface of the acrylic film for punching of the present invention.

Examples of an apparatus for evaluating the edge-surface luminance of the acrylic film for punching of the present invention include a measuring apparatus as shown in FIG. 2. Light emitted from a light-source 5 is incident upon the edge surface (a) of an acrylic film 3 for punching of the present invention whose surface is coated with a reflection sheet 4, transmitted through the film and emitted from the edge surface (b).

When the edge-surface luminance of the acrylic film for punching of the present invention is measured, the distance from the edge surface (a) to the edge surface (b) is preferably 5 cm or more on the assumption of the length of the light guide plate for use in a small display such as a cell phone. Furthermore, the distance is more preferably 10 cm or more on the assumption of use in a display of a middle-size portable game machine and particularly preferably 20 cm or more on the assumption of use in a larger display such as a notebook-size personal computer.

If the distance from the edge surface (a) to the edge surface (b) is 20 cm or more, a slight difference in transmission loss due to light absorption, scattering, reflection, etc., can be likely to be observed as a large luminance difference.

Even if the distance from the edge surface (a) to the edge surface (b) is long, high edge-surface luminance can be obtained. Such a film has high transparency and is thus suitable as an optical member, particularly suitable for use in a light guide plate requiring transparency for a long optical path.

As the edge-surface luminance of the acrylic film for punching of the present invention used as a light guide plate, in the case where a measuring apparatus setting a distance between the edge surface (a) and the edge surface (b) at 20 cm is used, more specifically, as a relative edge-surface luminance of the acrylic film for punching of the present invention based on the edge-surface luminance of a PMMA film having the same thickness and size as those of the acrylic film for punching of the present invention and formed by using methyl methacrylate alone as a monomer, regarded as 100%, 50% or more is preferable, 70% or more is more preferable and 90% or more is particularly preferable.

In the present invention, as a light guide plate obtained from the acrylic film for punching of the present invention, a light guide plate for a thin liquid-crystal display device is suitable.

When the acrylic film for punching of the present invention is used as a light guide plate, particularly as a film for a light guide plate with an LED, it is preferred that a micro convexoconcave configuration be formed on a film side surface (light incident surface) upon which light from LED is incident in order to enhance uniformity of luminance.

Examples of the micro convexoconcave configuration to be formed on the side-surface of a film include a prism configuration such as a V-shaped or a triangular configuration continuously formed at regular pitches, and continuous circular arc or wave form and a combination of these configurations.

Micro convexoconcave configuration to be formed on the side surface of a film is preferably a configuration having a circular arc or wavy convexoconcave having a radius of 0.2 mm or less, preferably 0.1 mm or less, more preferably 0.05 mm or less or a prism configuration. A specific example of the micro convexoconcave configuration is shown in FIG. 1. FIG. 1 shows a convexoconcave configuration consisting of circular arcs or wave form having a radius (1) and continuously repeated while alternately changing in direction at intervals, pitches (2).

The thickness of the acrylic film for punching of the present invention is preferably 500 μm or less, more preferably 5 μm to 500 μm, further preferably 25 μm to 400 μm and particularly preferably 30 μm to 350 μm. If the thickness of the acrylic film for punching of the present invention is 500 μm or less, it can be likely to be used in an optical member, particularly in a thin light guide plate.

Examples of a process for manufacturing an acrylic film for punching of the present invention include a process for obtaining an acrylic film for punching of the present invention by pouring a monomer material (c) into a mold formed of e.g., a plastic film such as a PET film, a metal such as stainless steel or glass, or a mold formed of belts or dies facing each other, and polymerizing the monomer material (c) by application of e.g., heat or an active energy ray.

In the process, when the monomer material (c) is cured by application of an active energy ray, it is preferred to use a transparent glass or plastic in one or both of the belts or dies facing each other.

Furthermore, another example of a process for manufacturing an acrylic film for punching of the present invention include a continuous manufacturing process including supplying a monomer material (c) onto an endless belt, laminating a film, which is transferred in the same direction at the same speed as those of the endless belt, on the resultant structure, and curing the film by applying an active energy ray.

In continuous manufacturing the acrylic film for punching of the present invention, the resultant film can be wound around a roll such as a paper pipe or a plastic core and collected.

The acrylic film for punching of the present invention is suitable for punching.

<Process for Manufacturing an Optical Member>

In the present invention, an embodiment of a process for manufacturing an optical member is a manufacturing process including 1) a step of forming a micro convexoconcave configuration on one or both of the surfaces of the acrylic film for punching of the present invention, followed by 2) a step of obtaining an optical member by punching.

In the step of forming a micro convexoconcave configuration on one or both of the surfaces of the acrylic film for punching of the present invention, a method of forming a convexoconcave configuration simultaneously with formation of the film and a method for forming a convexoconcave configuration after formation of the film are employed.

Examples of the method of forming a convexoconcave configuration simultaneously with formation of the film include a method of polymerizing a monomer material (c) on a PET film or a stainless steel belt having a micro convexoconcave configuration previously formed thereon to form the convexoconcave configuration on a film surface.

Examples of the method for forming a convexoconcave configuration after formation of a film include a method of forming a convexoconcave configuration on a film surface by a thermal imprinting system in which a configuration is transferred by thermal press using a configuration transfer member; a UV inkjet printing system in which a configuration is formed by spraying a photo-curable resin composition and curing the resin; a laser processing system in which a configuration is formed by processing a resin surface by $CO_2$ laser, etc., or a resin printing system in which a photo-curable resin composition is applied and a configuration is transferred by use of a configuration transfer member or in which a silk printing resin composition is applied and a configuration is transferred by use of a configuration transfer member.

Examples of the micro convexoconcave configuration include a mat structure, a dot configuration or a prism array structure formed on one or both of the surfaces of the acrylic film for punching of the present invention. These structures may be formed singly or in combination with two or more types on the surface of the acrylic film for punching of the present invention.

In the above step of forming a micro convexoconcave structure, a method of performing a butch system after an acrylic film for punching is cut or punched into pieces of a predetermined size, or a method of performing a continuous system using a roll film are employed. In view of productivity, performing the continuous system using a roll film is more preferable.

In the step of obtaining an optical member by punching, for example, a method of preparing a mold by use of a single or two or more punching blades and punching a film into a predetermined configuration by the mold with the help of a press machine is employed.

Examples of blades for use in punching include a Thomson blade, a seal blade (spring blade), an engraving blade and an etching blade. Of these, as a blade for forming a micro convexoconcave configuration, an engraving blade having a high dimensional accuracy applicable to machine processing controlled by numerical values and capable of preparing a complicated configuration. Furthermore, in a punching process, punching may be performed under a predetermined temperature.

If punching is performed by use of a mold having a liner configuration or a micro convexoconcave configuration, a complementary configuration to that of the mold can be formed on the processed surface (side surface). To the processed surface of the acrylic film for punching of the present invention, a single structure or a combination of two or more of these structures may be formed. Furthermore, after punching, the processed surface may be polished.

When the acrylic film for punching of the present invention is used as a film for a light guide plate of a surface light-source device, particularly as a film for a light guide plate with an LED, more preferably, micro convexoconcave configurations are formed so as to be in consistent with the intervals of an LED array in the film side-surface in order to enhance uniformity in luminance.

<Surface Light-Source Device>

As mentioned above, a light guide plate can be formed by use of the acrylic film for punching of the present invention.

Now, embodiments of a light guide body and a surface light-source device according to the present invention will be more specifically described with reference to the drawings. However, the scope of the present invention is not limited by these embodiments.

In the embodiments, like reference numerals are used in several different drawings to designate like members for brevity's sake. Furthermore, the drawings of the embodiments are used for describing the content of the present invention and thus the dimensional ratios of individual portions do not accurately reflect actual ratios.

Furthermore, an xyz orthogonal coordinate system is applied in the figures for convenience sake of reference. More specifically, the x axis and the y axis are applied along a light traveling direction in the light guide body, more specifically, along two sides of the upper surface or the lower surface of the light guide body and the z axis is applied in the normal-line direction of the light emitting surface.

Figure 3:
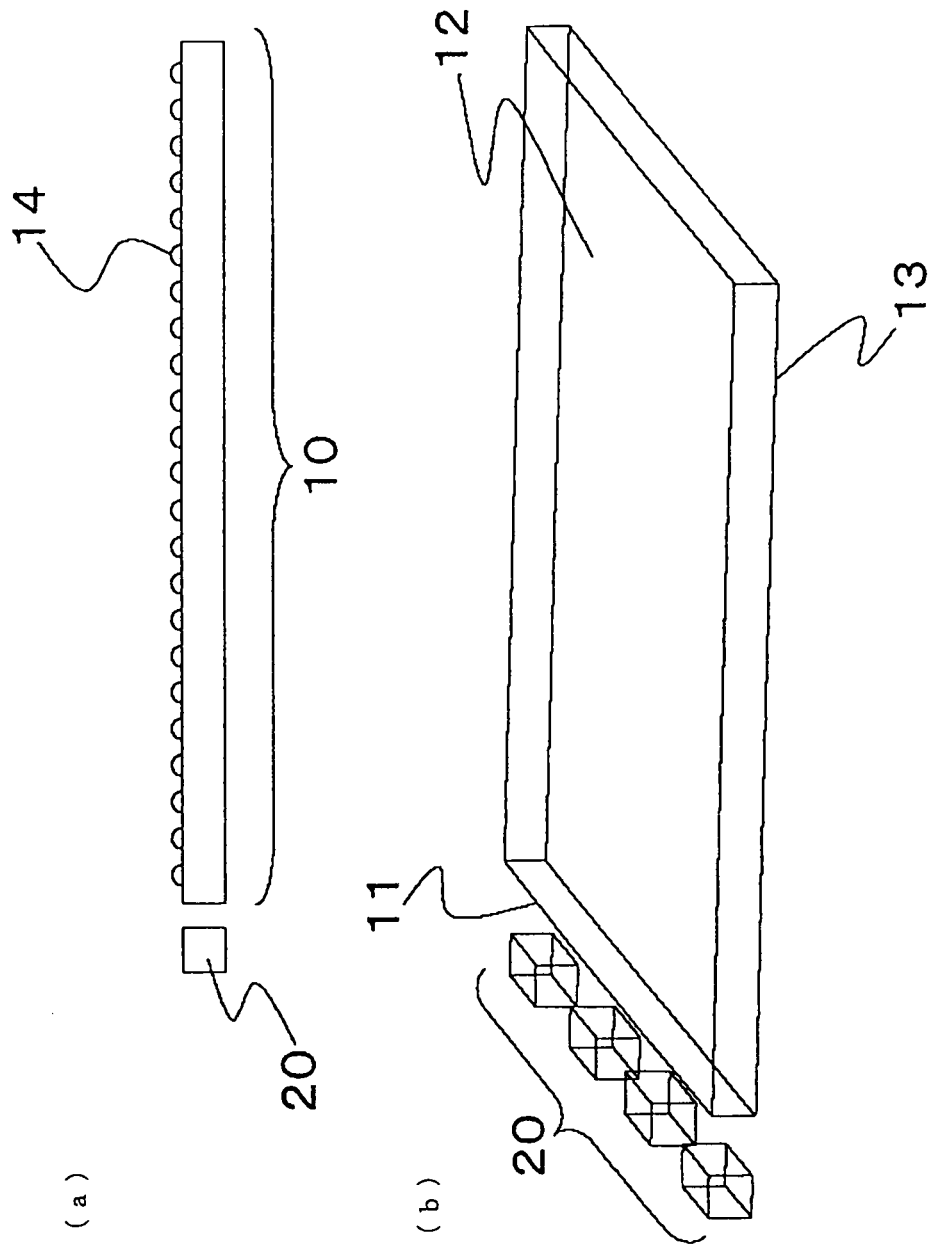
FIG. 3 is a schematic sectional view showing an embodiment of the light guide body of the present invention.

FIG. 3 shows a schematic view of a light guide body 10 of the embodiment. In the figure, light-emitting diodes 20 serving as a primary light-source are shown together. Note that, as a light-source, other than a plurality of light-emitting diodes as shown in FIG. 1, a fluorescent tube such as a cold cathode tube can be used; however, a light-emitting diode is desirably used because the side surface from which light is emitted is short.

The light guide body 10 has at least a light incident surface 11 on which light is incident from a primary light-source, a light emitting surface 12 from which light is emitted from the light guide body and a reflection surface 13 which reflects the incident light from the light incident surface 11 or the reflection light from the light emitting surface 12.

More specifically, the light emitting surface 12 and/or the reflection surface 13 of the light guide body 10 have a single or a plurality of concave or convex light control portions 14 having a function of emitting light. The light control portion(s) 14 can be prepared by using a processing method such as a thermal imprint system, a UV inkjet printing system, a laser processing system and a resin printing system.

Examples of a primary light-source to be used in combination with a light guide body include a thin light-emitting diode. The thickness dimension of the light emitting portion is, for example, about 250 to 500 µm. Accordingly, the thickness of the light guide body is preferably 500 µm or less. Owing to this, even if a surface light-source device is sufficiently reduced in thickness by using a small light emitting diode as mentioned above, almost entire light emitted from a primary light-source can be introduced in the light guide body and efficiently used and the light use efficiency can be maintained high. Furthermore, the thickness of the light guide body is preferably 5 µm or more.

Furthermore, if the thickness of the light guide body is 500 µm or less, proper flexibility can be obtained, with the result that a long light guide body can be continuously supplied in a process of manufacturing a liquid guide body. This is advantageous in a manufacturing point of view.

In the surface light-source device of the present invention, a light deflection device is arranged in contact with the surface of the light guide body. As the light deflection device, a combination of the prism sheet provided with the face down and a diffusion sheet or a combination of two types of prism sheets provided with the face up as shown below and a diffusion sheet is used.

Figure 4:
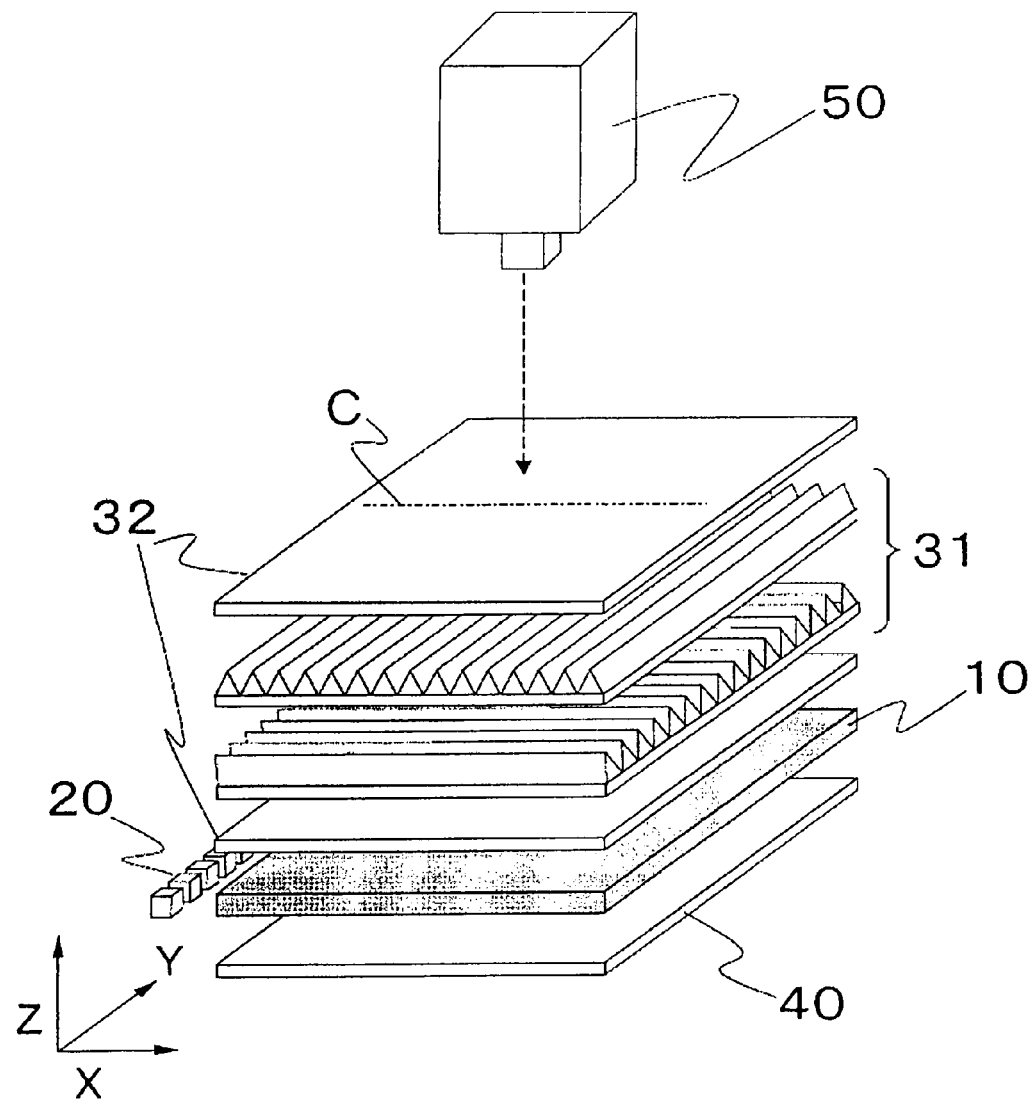
FIG. 4 is a schematic exploded perspective view showing an embodiment of a surface light-source device using the light guide body of the present invention.

FIG. 4 is a schematic exploded perspective view showing an embodiment of a surface light-source device using a light guide body.

In FIG. 4, the light guide body 10 is arranged such that the light emitting surface 12 and the reflection surface 13 (see FIG. 3) are positioned within the xy plane, and the configuration of the xy plane is a rectangle having a side along the x axis and a side along the y axis. In adjacent to the light incident surface 11 of the light guide body 10 (see FIG. 3), a plurality of LEDs 20 serving as a primary light-source are arranged along the y axis at appropriate pitches. So as to face the light emitting surface 12 of the light guide body 10, two prism sheets 31 serving as a light deflection device and a diffusion sheet 32 are arranged. The prism sheets 31 are arranged such that respective prism extending directions are perpendicularly crossed with each other. On the other hand, a reflection sheet 40 serving as a reflector is arranged so as to face the reflection surface 13 of the light guide body 10.

Light emitted from LED 20s is introduced in the light guide body 10 through the light incident surface 11 and guided to the xy in-plane direction within the light guide body 10 by inner and total refection of the light emitting surface 12 and the reflection surface 13. The light emitting surface 12 and/or the reflection surface 13 have a single or a plurality of convex or concave light control portions 14 (see FIG. 1). Since the convex or concave configuration exerts a light emission function, light is emitted at a required light emission rate. The light, which is emitted from the light emitting surface of the light guide body 10, obliquely to the normal-line direction (Z direction) and distributed within the XZ-plane, is incident upon the lower surface (light incident surface) of the prism sheet 31 and deflected by refraction to proceed roughly in the Z direction. The deflected light is emitted from the upper surface of the prism sheet 31 (serving as a light emitting surface). Note that, in guiding light, the light emitted from the reflection surface 13 is reflected by the reflection sheet 40 and again introduced in the light guide body 10.

In the surface light-source device, a change ratio of an x value and a y value of the color coordinate of light emitted from the light deflection device versus a light guide distance from an edge surface of the light guide body is preferably 0.00065/cm or less, more preferably 0.00050/cm or less, and further preferably 0.0004/cm or less.

The change rate is obtained as follows.

A rectangular acrylic film of 180 mm in length and 280 mm in width having a convex semispherical configuration of 53 μm in diameter and 10 μm in height formed on a rear surface; a light-source consisting of 63 white-chip type LEDs (trade name: NSSW045, manufactured by Nichia Corporation) of 450 μm in thickness arranged laterally in a single line at intervals of 4.88 mm; a reflection sheet; a diffusion sheet; and prism sheets are arranged as shown in FIG. 4. The edge surface in contact with the LEDs is 280 mm. Subsequently, a luminance meter (trade name: BM-7A, manufactured by TOPCON TECHNOHOUSE CORPORATION) is arranged at a distance of 1 m from the light emitting surface. An x value and y value of a color coordinate are measured along the normal-line direction. While the luminance meter is moved at intervals of 2 mm from the light incident surface of the light guide body toward the center portion thereof, on line C, which corresponds to the center line of the light guide body in the direction (the x-axis direction) along the light emitting surface of the light guide body and perpendicular to the intersection of the light incident surface and the light emitting surface, an x value and a y value are measured at each point. From a least square approximation line, a color-coordinate change rate is calculated as a slope of the line.

Furthermore, an embodiment of the present invention is understood as follows.

The surface light-source device according to the present invention is a surface light-source device emitting planar light by converting light from a single or a plurality of light-sources into planar light, which includes a light guide body, at least one light-source arranged in adjacent to an edge surface of the light guide body, a light deflection device arranged in contact with a surface of the light guide body, and a reflector arranged in contact with the rear surface of the light guide body, in which the light guide body is constituted of a polymer (C) containing a di(meth)acrylate (A) unit represented by general formula (1) and a mono(meth)acrylate (B) unit.

Furthermore, the light guide body of the surface light-source device according to the present invention is constituted of a polymer (C) containing a di(meth)acrylate (A) unit represented by the general formula (1) and a mono (meth)acrylate (B) unit.

According to the present invention as described above, it is possible to obtain a light guide body rarely broken even if it is thin and excellent in color property and a surface light-source device using the liquid guide body.

In Patent Literature 2 as mentioned above, fine particles containing a rubber component are added to PMMA. However, if the fine particles containing a rubber component are added, a non-uniform structure is formed with PMMA to induce inner scattering, reducing surface light emission intensity. Furthermore, in the case of a polycarbonate, polycarbonate absorbs light more or less within a short wavelength region near a UV region. Therefore, in the light guide body using these, coloration called yellowing may sometimes occur during a light guiding process. The coloration is not preferable since display characteristics are lowered particularly when a surface light-source device is used as a backlight of a liquid-crystal display device. Therefore, it has been desired to provide a surface light-source device using a light guide body overcoming the aforementioned problem, rarely broken even if it is thin, capable of suppressing coloration and excellent in transparency. Then, if a light guide body is formed in accordance with the structure of the present invention as mentioned above, it is possible to provide a surface light-source device using a light guide body rarely broken even if it is thin, capable of suppressing coloration and excellent in transparency.

EXAMPLES

Now, the present invention will be described by way of Examples. Note that punching processability, elastic modulus, stretch rate at the time of cutting, total light transmissivity, haze value, edge-surface luminance and color coordinate change rate of an acrylic film were evaluated by the following methods. Furthermore, in the following description, "parts" refers to "parts by mass".

(1) Punching Processability

Two types of engraving blades having micro convexoconcave configurations, one having a height of 23.6 mm and a radius (R) of 0.2 mm and aligned at a pitch of 0.8 mm, and the other having a height of 23.6 mm and a radius (R) of 0.1 mm and aligned at a pitch of 0.4 mm, as shown in FIG. 1 were prepared. Subsequently, two types of rectangular punching dies each having either one of the sides of these engraving blades and three sides of Thomson blade of 23.6 mm in height were prepared.

On each of the two types of punching dies obtained above, an acrylic film was placed. On the film, a PET film of 188 μm in thickness and a polycarbonate board of 5 mm in thickness are sequentially stacked. Using an electromotive-driven press machine (trade name: PAC-SBP-07, manufactured by DIETECS Corp.), the acrylic films were separately punched at a press pressure of 5t and a speed of 10 mm/second.

In the acrylic film pieces obtained by punching, micro convexoconcave configurations, which were obtained by punching by the engraving blade, were checked for the presence or absence of breakage and crack by use of an ultra-deep microscope (trade name: VK-8500, manufactured by KEYENCE CORPORATION). Then, punching processability was evaluated in accordance with the following criteria.
  good: Neither breakage nor crack are observed.
  poor: Breakage and crack are observed.
Furthermore, the punched surface was checked for the presence or absence of whitening by use of an ultra-deep microscope (trade name: VK-8500, manufactured by KEYENCE CORPORATION) and at the same time, evaluated in accordance with the following criteria.
  good: No whitening is observed.
  poor: Whitening is observed.

(2) Elastic Modulus

Five test pieces of Dumbbell-form No. 1 type acrylic film were prepared by use of Super Dumbbell cutter (trade name: SDK-100D, manufactured by DUMBBELL CO., LTD.). Next, using these test pieces, a tensile test was performed by use of a tensile test machine (trade name: Strograph T, manufactured by Toyo Seiki Seisaku-sho, Ltd.) at room temperature of 23° C. and a tension rate of 500 mm/minute. The tensile test was repeated five times. Then, a tangent line of a stress distortion curve was defined as an elastic modulus and an average value of them was obtained.

(3) Stretch Rate at the Time of Film Cutting

Five test pieces of Dumbbell-form No. 1 type acrylic film were prepared by use of Super Dumbbell cutter (trade name: SDK-100D, manufactured by DUMBBELL CO., LTD.) in accordance with JIS K6251. Next, using these test pieces, a tensile test was performed by use of a tensile test machine (trade name: Strograph T, manufactured by Toyo Seiki Seisaku-sho, Ltd.) at room temperature of 23° C. and a tension rate of 500 mm/minute. The tensile test was repeated five times. Then, stretch rates at the time of cutting were averaged.

(4) Total Light Transmissivity

Total light transmissivity of acrylic film cut into pieces of 5 cm squares was measured by use of a haze meter (trade name: NDH2000, manufactured by Nippon Denshoku Industries Co., Ltd.) in accordance with JIS K7361-1.

(5) Haze Value

Haze value of acrylic film cut into pieces of 5 cm squares was measured by use of a haze meter (trade name: NDH2000, manufactured by Nippon Denshoku Industries Co., Ltd.) in accordance with JIS K7105.

(6) Edge-Surface Luminance

A rectangular acrylic film of 200 mm in length and 100 mm in width, a light-source consisting of 20 white-chip type LEDs (trade name: NSCW335, manufactured by Nichia Corporation) of 450 μm in thickness arranged laterally in a single line; and a reflection sheet (trade name: LUIREMIRROR manufactured by REIKO Co., Ltd.) of 50 μm in film thickness were arranged as shown in FIG. 2. In this state, the edge-surface luminance of the acrylic film was measured.

The distance of the acrylic film between an edge surface (a) and an edge surface (b) is 200 mm. Furthermore, the surfaces of the edge surface (a) and the edge surface (b) of the acrylic film were polished by a rotatory polisher (trade name: AP-120, manufactured by Kasai Shoko Kabushiki Kaisha) using #1200 polishing paper and then the acrylic film was put in use.

In measuring edge-surface luminance, a luminance meter (trade name: CS-100A, manufactured by Konica Minolta Sensing, Inc.) was arranged at a distance of 1 m from the edge surface (b). An edge surface luminance was measured when light incident upon the edge surface (a) was emitted from the edge surface (b).

Furthermore, at the same time, a relative luminance was obtained based on the edge-surface luminance of a PMMA film obtained by using a methyl methacrylate alone as a monomer, regarded as 100.

(7) Color Coordinate Change Rate

A rectangular acrylic film of 180 mm in length and 280 mm in width having a convex semispherical configuration of 53 μm in diameter and 10 μm in height formed on a rear surface; a light-source consisting of 63 white-chip type LEDs (trade name: NSSW045, manufactured by Nichia Corporation) of 450 μm in thickness arranged laterally in a single line at intervals of 4.88 mm; a reflection sheet; a diffusion sheet; and prism sheets were arranged as shown in FIG. 4. In this state, the color coordinate change rate of the acrylic film was measured. The edge surface thereof in contact with the LEDs is 280 mm.

In measuring a color coordinate change rate, a luminance meter (trade name: BM-7A, manufactured by TOPCON TECHNOHOUSE CORPORATION) was arranged at a distance of 1 m from the light emitting surface. An x value and y value of a color coordinate were measured along the normal-line direction. Note that, while the luminance meter was moved at intervals of 2 mm from the light incident surface of the light guide body toward the center portion thereof, on line C, which corresponds to the center line of the light guide body in the direction (the x-axis direction) along the light emitting surface of the light guide body and perpendicular to the intersection of the light incident surface and the light emitting surface, an x value and a y value were measured at each point. From a least square approximation line, a color-coordinate change rate was calculated as a slope of the line.

Example 1

A raw material for a di(meth)acrylate (A) unit, i.e., polybutylene glycol dimethacrylate (A-1) (trade name: ACRYESTER PBOM, represented by the formula (1) wherein $R^1=CH_3$, $(X)_n=(C_4H_8)_9$, manufactured by Mitsubishi Rayon Co., Ltd.): 80 parts; a raw material for a mono(meth) acrylate (B) unit, i.e., methyl methacrylate (B-1) (trade name: ACRYESTER M manufactured by Mitsubishi Rayon Co., Ltd.): 20 parts; a thermal polymerization initiator, i.e., t-hexylperoxy pivalate (trade name: PERHEXYL PV, manufactured by NOF Corporation): 0.3 parts; and a mold-releasing agent, i.e., sodium dioctylsulfosuccinate (trade name: AEROSOL OT-100, manufactured by Mitsui Cytec Ltd.): 0.05 parts were mixed to prepare a monomer material (c-1) and subjected to a deaeration treatment under reduced pressure.

A glass plate of 300 mm long and 300 mm wide was arranged so as to face each other at an interval of 0.4 mm with a gasket formed of polyvinyl chloride interposed between them to form a mold. Into the mold thus formed, the monomer material (c-1) was poured. Subsequently, the mold was heated in a water bath of 80° C. for 60 minutes, and subsequently heated in an air furnace of 130° C. for 30 minutes to complete polymerization. Thereafter, the mold was cooled to room temperature and the frame mold was removed to obtain an acrylic film (a) having an average thickness of about 400 µm. The evaluation results are shown in Table 1.

between a mirror plate and a configuration transfer member having a concave semispherical shape of 53 µm in diameter and 10 µm in height formed on a mirror plate, and pressed by a thermal press machine (trade name: NIC200 type laminate molding machine manufactured by Nissei Plastic Industrial Co., Ltd.) to form the micro convex configuration on one of the surfaces. The resultant acrylic film was punched into a

TABLE 1

| | Acrylic film | Composition of polymer (c) (parts) | | | | | | Molecular weight of $(X)_n$ | State of punched surface | | Presence or absence of whitening |
|---|---|---|---|---|---|---|---|---|---|---|---|
| | | A-1 | A-2 | A-3 | B-1 | D-1 | E-1 | | R = 0.2 mm | R = 0.1 mm | |
| Example 1 | (a) | 80 | — | — | 20 | — | — | 648 | good | poor | good |
| Example 2 | (b) | 60 | — | — | 40 | — | — | 648 | good | good | good |
| Example 3 | (C) | 40 | — | — | 60 | — | — | 648 | good | good | good |
| Example 4 | (d) | 30 | — | — | 70 | — | — | 648 | good | poor | good |
| Example 5 | (e) | 20 | — | — | 80 | — | — | 648 | good | poor | good |
| Comparative Example 1 | (f) | — | — | — | 100 | — | — | — | poor | poor | good |
| Comparative Example 2 | (g) | 100 | — | — | — | — | — | 648 | poor | poor | good |
| Example 6 | (h) | — | 80 | — | 20 | — | — | 1700 | good | good | good |
| Example 7 | (i) | — | 60 | — | 40 | — | — | 1700 | good | good | good |
| Example 8 | (j) | — | 50 | — | 50 | — | — | 1700 | good | good | good |
| Example 9 | (k) | — | 40 | — | 60 | — | — | 1700 | good | good | good |
| Example 10 | (l) | — | 30 | — | 70 | — | — | 1700 | good | good | good |
| Example 11 | (m) | — | 25 | — | 75 | — | — | 1700 | good | good | good |
| Comparative Example 3 | (n) | — | — | 40 | 60 | — | — | 132 | — | — | — |
| Comparative Example 4 | (o) | — | — | — | — | 100 | — | — | poor | poor | good |
| Comparative Example 5 | (p) | — | — | — | — | 78 | 22 | — | poor | poor | poor |

| | Elastic modulus (MPa) | Stretch rate at the time of cutting (%) | Total light transmissivity (%) | Haze value (%) | Luminance (cd/m2) | Relative luminance (—) |
|---|---|---|---|---|---|---|
| Example 1 | 30 | 30 | 92.7 | 0.2 | 3940 | 70 |
| Example 2 | 350 | 50 | 92.7 | 0.2 | 3540 | 63 |
| Example 3 | 1400 | 30 | 92.5 | 0.2 | 4160 | 74 |
| Example 4 | 1700 | 10 | 92.5 | 0.2 | 6400 | 114 |
| Example 5 | 2100 | 6 | 92.5 | 0.2 | 5000 | 89 |
| Comparative Example 1 | 3500 | 3 | 92.5 | 0.2 | 5600 | 100 |
| Comparative Example 2 | 30 | 10 | 92.5 | 0.2 | 1790 | 32 |
| Example 6 | 5 | 60 | 92.8 | 0.2 | 1700 | 30 |
| Example 7 | 8 | 110 | 92.7 | 0.2 | 740 | 13 |
| Example 8 | 90 | 160 | 92.7 | 0.2 | 1900 | 34 |
| Example 9 | 600 | 110 | 92.6 | 0.2 | 2460 | 44 |
| Example 10 | 1300 | 60 | 92.4 | 0.2 | 5800 | 104 |
| Example 11 | 1300 | 60 | 92.4 | 0.2 | 3700 | 66 |
| Comparative Example 3 | 1900 | 2 | — | — | — | — |
| Comparative Example 4 | 2590 | 3 | 93.3 | 0.4 | 5328 | 95 |
| Comparative Example 5 | 1430 | 4 | 93.0 | 0.4 | 3260 | 58 |

Examples 2 to 5, Comparative Examples 1 and 2

Acrylic films (b) to (g) were obtained in the same manner as in Example 1 except that the use amounts of polybutylene glycol dimethacrylate (A-1) and methyl methacrylate (B-1) were set to be those shown in Table 1. The evaluation results are shown in Table 1.

Figure 5:
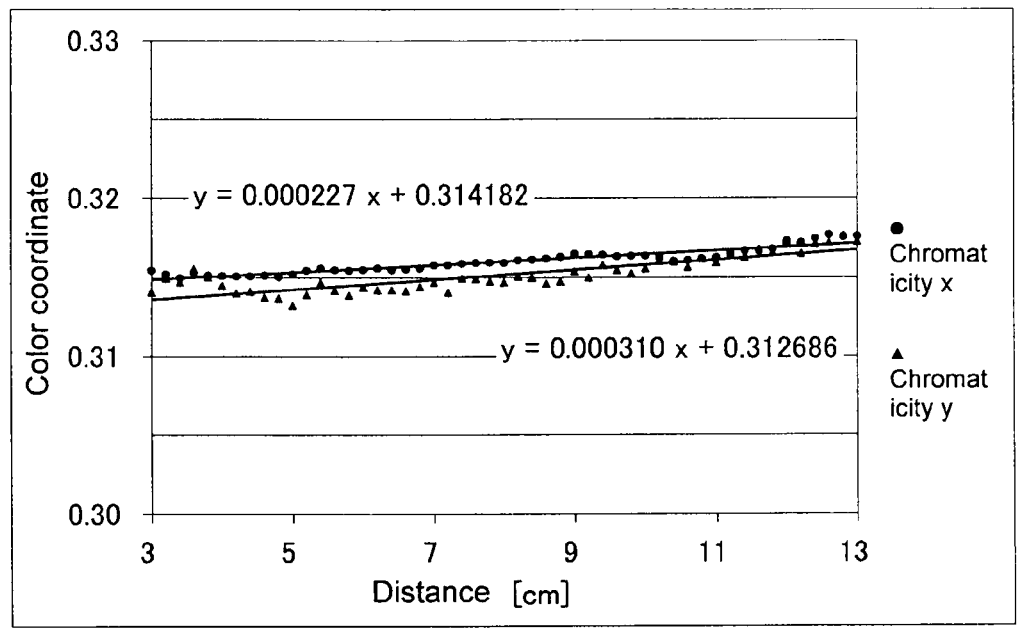
FIG. 5 is a graph showing a change of color coordinates x and y versus light guiding distance in Example 4.

Furthermore, with respect to the acrylic film (d) obtained in Example 4, the acrylic film in A4 size was sandwiched rectangular film pieces having a length of 180 mm and a width of 280 mm. The processed surface having a width of 280 mm was processed into a mirror surface by use of a mirror finishing machine (trade name: Prafinisher, manufactured by ASAHI TECHNO CO. LTD.) under the conditions: a rotation number of 9000 rpm and a feed rate of 2.5 mm/sec. Subsequently, a surface light-source device was prepared by arranging a light-source consisting of 63 white-chip type LEDs (trade name: NSSW045, manufactured by Nichia Corporation) of 450 μm in thickness arranged laterally in a single line at intervals of 4.88 mm; a reflection sheet; an acrylic film (d) having a micro convex configuration formed on a rear surface; a diffusion sheet; and prism sheets, as shown in FIG. 4. The edge surface thereof in contact with the LEDs is 280 mm. The evaluation results are shown in Table 2 and FIG. 5.

TABLE 2

| | Acrylic film | Composition of polymer (c) (parts) | | | | | | Molecular weight of $(X)_n$ | Color coordinate change rate | |
| --- | --- | --- | --- | --- | --- | --- | --- | --- | --- | --- |
| | | A-1 | A-2 | A-3 | B-1 | D-1 | E-1 | | x value | y value |
| Example 4 | (d) | 30 | — | — | 70 | — | — | 648 | 0.000227 | 0.000310 |
| Example 10 | (l) | — | 30 | — | 70 | — | — | 1700 | 0.000215 | 0.000245 |
| Comparative Example 4 | (o) | — | — | — | — | 100 | — | — | 0.000182 | 0.000200 |
| Comparative Example 5 | (p) | — | — | — | — | 78 | 22 | — | 0.000454 | 0.000733 |

Examples 6 to 11

Figure 6:
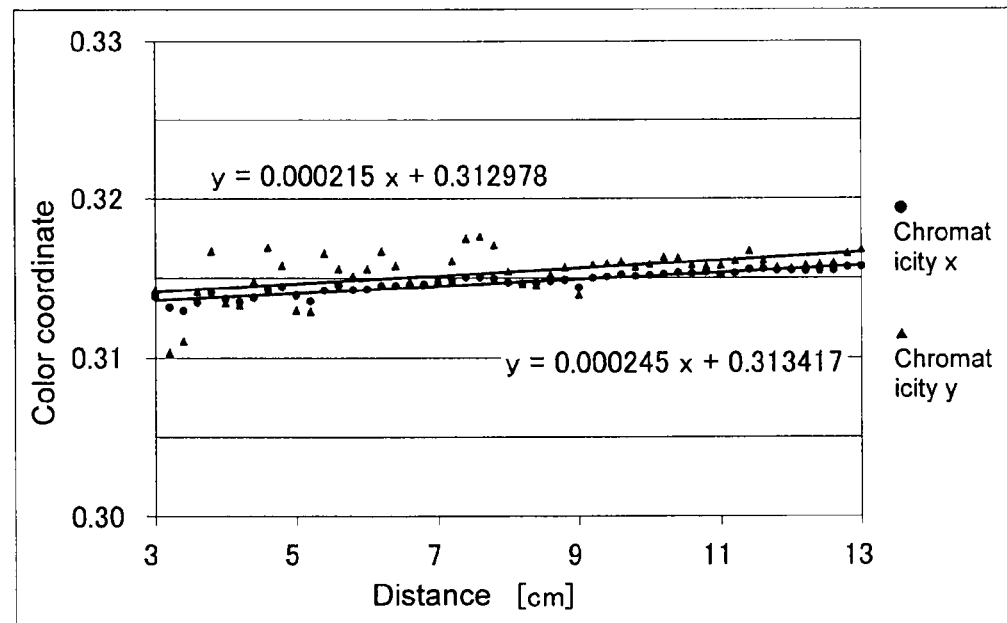
FIG. 6 is a graph showing a change of color coordinates x and y versus light guiding distance in Example 10.

Acrylic films (h) to (m) were obtained in the same manner as in Example 1 except that polyoxyethylene.polyoxypropylene dimethacrylate (A-2) (trade name: BLEMMER 40PDC-1700B, represented by the formula (1) wherein $R^1$=$CH_3$, $((X_n$=$(C_2H_4O)_{7.5}(C_3H_6O)_{18}$—$(C_2H_4O)_{7.5}$, manufactured by NOF Corporation) was used in place of (A-1) as the di(meth)acrylate (A), and the use amounts of (A-2) and (B-1) were set to be those shown in Table 1. The evaluation results are shown in Table 1. With respect to acrylic film (I) obtained in Example 10, a surface light-source device was prepared in the same manner as in Example 4. The evaluation results are shown in Table 2 and FIG. 6.

Comparative Example 3

An acrylic film (h) was prepared in the same manner as in Example 1 except that triethylene glycol dimethacrylate (A-3) (trade name: ACRYESTER 3ED, manufactured by Mitsubishi Rayon Co., Ltd.) was used in place of (A-1) as a raw material for the di(meth)acrylate (A) unit and the use amounts of (A-3) and (B-1) were set to be those shown in Table 1. The resultant acrylic film (h) was extremely fragile and difficult to be removed from a mold. Thus, punching processability was not evaluated.

Comparative Example 4

Figure 7:
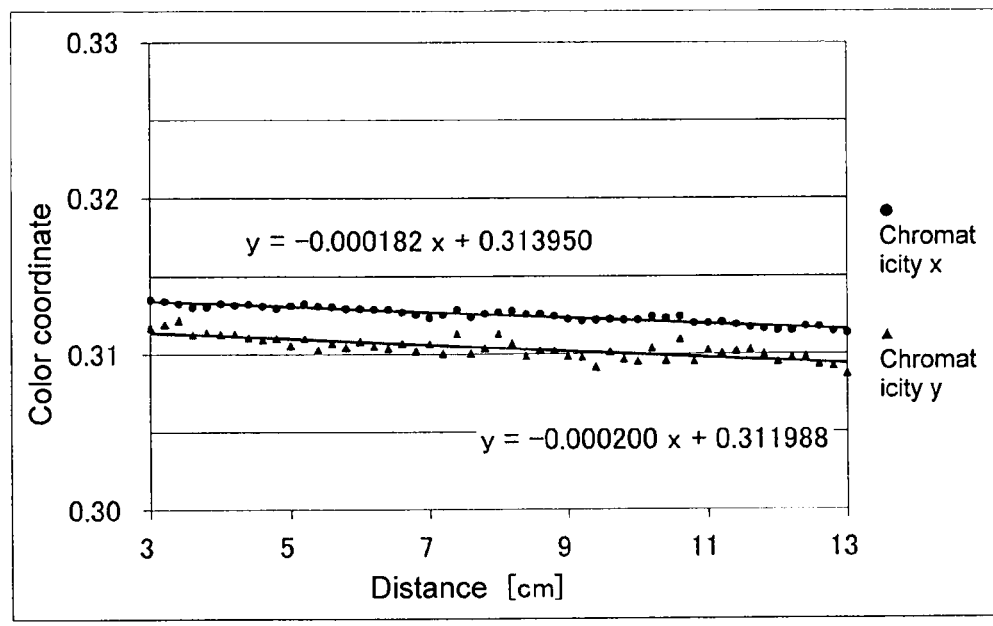
FIG. 7 is a graph showing a change of color coordinates x and y versus light guiding distance in Comparative Example 4.

As a raw material for a mono(meth)acrylate (B) unit, pellets of polymethyl methacrylate (D-1) (trade name: VH000, manufactured by Mitsubishi Rayon Co., Ltd.) were dried at 80° C. a whole day and night. The dry pellets were supplied to 40 mmφ non-belt screw type extruder (L/D=26) equipped with a T-die having a width of 300 mm to obtain an acrylic film having an average thickness of about 400 μm. The conditions at that time were: cylinder temperature: 200 to 240° C., T-die temperature: 250° C., cold roll temperature: 95° C. The evaluation results are shown in Table 1. Furthermore, a surface light-source device was prepared in the same manner as in Example 4. The evaluation results are shown in Table 2 and FIG. 7.

Comparative Example 5

Figure 8:
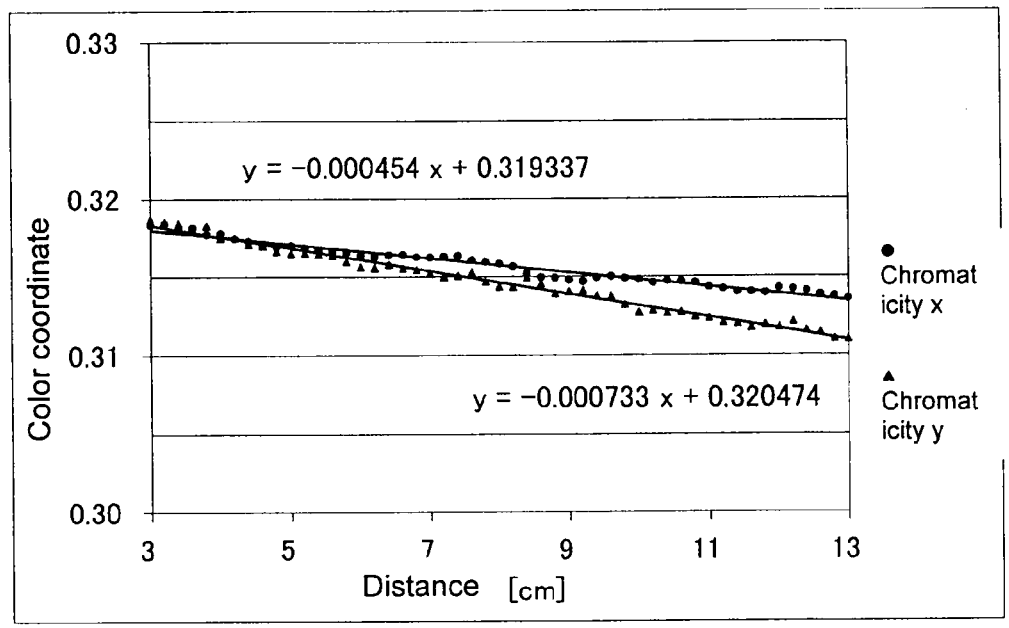
FIG. 8 is a graph showing a change of color coordinates x and y versus light guiding distance in Comparative Example 5.

To a mono(meth)acrylate (B), i.e., polymethyl methacrylate (D-1) (trade name: VH000, manufactured by Mitsubishi Rayon Co., Ltd.) pellets: 78 parts, a rubber-containing acrylic polymer (E-1) (trade name: METABLEN W377, manufactured by Mitsubishi Rayon Co., Ltd.): 22 parts was added, and then mixed by use of a Henschel mixer. Next, the resultant mixture was supplied to a deaeration system extruder (trade name: PCM-30, manufactured by Ikegai Ironworks Corp.) heated to 230° C., and kneaded to obtain pellets. An acrylic film having an average thickness of about 400 μm was obtained in the same manner as in Comparative Example 4 except that the pellets manufactured by the above method were used. The evaluation results are shown in Table 1. Furthermore, a surface light-source device was prepared in the same manner as in Example 4. The evaluation results are shown in Table 2 and FIG. 8.

In each of Examples 1 to 11, punching processability and transparency were satisfactory. Furthermore, in Examples 4 and 10, color coordinate change rate was small. In contrast, punching processability was not satisfactory in Comparative Example 1, since a di(meth)acrylate (A) unit was not contained and in Comparative Example 2, since a mono(meth)acrylate (B) unit was not contained. In Comparative Example 3, since the molecular weight of $(X)_n$ of a di(meth)acrylate (A) unit was insufficient, the resultant acrylic film was very fragile. In Comparative Example 4, since a di(meth)acrylate (A) unit was not contained, punching processability was not satisfactory. In Comparative Example 5, since a di(meth) acrylate (A) unit was not contained, punching processability was not satisfactory. Furthermore, color coordinate change rate was large.

REFERENCE SIGNS LIST

1: Radius of circular arc or wave form constituting a convexoconcave configuration
2: Pitch of circular arc or wave form constituting a convexoconcave configuration
3: Acrylic film
4: Reflection sheet
5: Light-source
6: Edge surface (a)
7: Edge surface (b)
10: Light guide body
11: Light incident surface
12: Light emitting surface
13: Reflection surface
14: Light control portion
20: LED
31: Prism sheet
32: Diffusion sheet
40: Reflection sheet

The invention claimed is:

1. An acrylic film comprising a polymer comprising (i) a mono(meth)acrylate unit and (ii) a di(meth)acrylate unit of formula (1):

$$-CH_2-CR^1-COO-(X)_n-COCR^1-CH_2- \quad (1)$$

wherein
(X) represents at least one repeat unit selected from the group consisting of $C_2H_4O$, $C_3H_6O$ and $C_4H_8O$;
$(X)_n$ has a number-average molecular weight of 500 or more; and
$R^1$ represents H or $CH_3$.

2. The acrylic film of claim 1, having a thickness of 5 μm to 500 μm.

3. A process for manufacturing an optical member, the process comprising forming a fine convexoconcave configuration on at least one surface of the acrylic film of claim 1 and punching the acrylic film to obtain the optical member.

4. The process of claim 3, wherein the fine convexoconcave configuration is formed on a processed surface by the punching.

5. A surface light-source device emitting planar light by converting light from a single or a plurality of light-sources into planar light, the device comprising
a light guide body, a light-source arranged adjacent to an edge surface of the light guide body, a light deflection device arranged in contact with a surface of the light guide body, and a reflector arranged in contact with a rear surface of the light guide body,
wherein the light guide body comprises a polymer comprising (i) a mono(meth)acrylate unit and (ii) a di(meth)acrylate unit of formula (2):

$$-CH_2-CR^1-COO-(X)_n-COCR^1-CH_2- \quad (2)$$

wherein
(X) represents at least one repeat unit selected from the group consisting of $C_2H_4O$, $C_3H_6O$ and $C_4H_8O$;
$(X)_n$ has a number-average molecular weight of 500 or more; and
$R^1$ represents H or $CH_3$.

6. The device of claim 5, wherein a change ratio of an x value and a y value of a color coordinate of light emitted from the light deflection device versus a light guide distance from an edge surface of the light guide body is 0.00065/cm or less.

7. The device of claim 5, wherein the single or plurality of light-sources is a light-emitting diode (LED).

8. A light guide body comprising a polymer comprising (i) a mono(meth)acrylate unit and (ii) a di(meth)acrylate unit of formula (3):

$$-CH_2-CR^1-COO-(X)_n-COCR^1-CH_2- \quad (3)$$

wherein
(X) represents at least one repeat unit selected from the group consisting of $C_2H_4O$, $C_3H_6O$ and $C_4H_8O$;
$(X)_n$ has a number-average molecular weight of 500 or more; and
$R^1$ represents H or $CH_3$.

9. A process for manufacturing an optical member, the process comprising forming a fine convexoconcave configuration on at least one surface of the acrylic film of claim 2 and punching the acrylic film to obtain the optical member.

10. The device of claim 6, wherein the single or plurality of light-sources is a light-emitting diode (LED).

11. The acrylic film of claim 1, wherein (X) represents $C_4H_8O$.

12. The acrylic film of claim 1, wherein $(X)_n$ represents $(C_4H_8O)_9$ and $R^1$ represents $CH_3$.

13. The acrylic film of claim 1, wherein $(X)_n$ represents $(C_2H_4O)_{7.5}-(C_3H_6O)_{18}-(C_2H_4O)_{7.5}$ and $R^1$ represents $CH_3$.

14. The acrylic film of claim 1, wherein the mono(meth)acrylate unit is methylmethacrylate.

15. The acrylic film of claim 1, wherein $(X)_n$ has a number-average molecular weight of 600 to 2000.

16. The acrylic film of claim 1, wherein the polymer comprises 10 to 90% by mass, based on the mass of the polymer, of the di(meth)acrylate unit.

17. The acrylic film of claim 1, wherein the polymer comprises 35 to 65% by mass, based on the mass of the polymer, of the di(meth)acrylate unit.

18. The acrylic film of claim 1, having a thickness of 30 μm to 350 μm.

19. The acrylic film of claim 1, having a stretch rate of 30% or more in a tensile test performed in accordance with JIS K6251 using a test piece of Dumbbell-form No. 1 at 23° C. and 500 mm/minute.

20. The acrylic film of claim 1, having a stretch rate of 50% or more in a tensile test performed in accordance with JIS K6251 using a test piece of Dumbbell-form No. 1 at 23° C. and 500 mm/minute.

* * * * *